United States Patent [19]

Welschof et al.

[11] Patent Number: 5,052,979
[45] Date of Patent: Oct. 1, 1991

[54] SHAFT ASSEMBLY FOR THE WHEEL DRIVE OF A MOTOR VEHICLE

[75] Inventors: Hans-Heinrich Welschof, Rodenbach; Rudolf Beier, Offenbach am Main, both of Fed. Rep. of Germany

[73] Assignee: Löhr & Bromkamp GmbH, Fed. Rep. of Germany

[21] Appl. No.: 28,015

[22] Filed: Mar. 18, 1987

Related U.S. Application Data

[63] Continuation of Ser. No. 884,316, Jul. 11, 1986, abandoned, which is a continuation of Ser. No. 765,333, Aug. 13, 1985, abandoned.

[30] Foreign Application Priority Data

Aug. 16, 1984 [DE] Fed. Rep. of Germany ....... 3430067

[51] Int. Cl.$^5$ ................................................ B60K 17/22
[52] U.S. Cl. ...................................... 464/140; 180/256
[58] Field of Search ............... 180/254, 256, 257, 258; 301/124 R, 124 H, 126; 384/490, 537, 544; 403/258, 260, 359; 464/113, 140, 178, 906

[56] References Cited

U.S. PATENT DOCUMENTS

| Re. 30,606 | 5/1981 | Sharp ........................... 464/140 X |
| 4,300,651 | 11/1981 | Krude ........................... 464/140 X |
| 4,372,418 | 2/1983 | Dangel ........................... 180/256 |
| 4,440,256 | 4/1984 | Palmer ........................... 384/544 X |
| 4,460,058 | 7/1984 | Welschof et al. ............. 180/258 |

FOREIGN PATENT DOCUMENTS 3141479 10/1981 Fed. Rep. of Germany .
1297368 11/1972 United Kingdom ................ 403/260

OTHER PUBLICATIONS

FIAT 128 Brochure, pp. 42–52.

Primary Examiner—Daniel P. Stodola
Attorney, Agent, or Firm—Toren, McGeady & Associates

[57] ABSTRACT

A wheel drive shaft assembly for a motor vehicle including two universal joints, at least one of which is a plunging joint to enable axial movement of the shaft assembly, with one of the universal joints further including a splined journal engaging into a wheel hub, wherein the axial length of the splined journal is smaller than the amount of axial shortening available in the shaft assembly by virtue of the plunging movement of the at least one plunging universal joint when the shaft assembly is built into the motor vehicle.

7 Claims, 2 Drawing Sheets

SHAFT ASSEMBLY FOR THE WHEEL DRIVE OF A MOTOR VEHICLE

This is a continuation of application Ser. No. 884,316, filed July 11, 1986 which is a continuation of application Ser. No. 765,333 filed Aug. 13, 1985, both now abandoned.

The invention relates generally to drive shaft mechanisms for the wheel drive of a motor vehicle and more particularly to an assembly having a pair of universal joints, at least one of which is a plunging joint, with the joint connected at the wheel end of the shaft assembly being provided with a splined journal or hub for engaging into the wheel hub or journal.

In the case of axle shafts having constant velocity universal joints, one of the joints at the transmission end is known to be integrated into the differential gear assembly of the vehicle for the purpose of reducing the joint angle. Attempts are also made to connect the constant velocity universal joint at the wheel end to the wheel bearing in a manner which conserves space and which provides as compact an assembly as possible without adversely affecting removal thereof.

In known rear wheel drive assemblies for passenger vehicles, the axial shafts thereof each contain two constant velocity plunging universal joints. This means that twice the plunging distance of the joint is available. However, in the event that repair work is necessary, there arises a disadvantage in that the shock absorber of the vehicle must be removed before it will be possible to remove the drive shaft. In the case of front drive shafts, assembly and removal conditions are generally even more complicated.

Accordingly, the present invention is directed toward providing a drive shaft assembly for the wheel drive of a motor vehicle which will be easy to assemble and which may be easily removed.

In particular, the invention is directed toward providing an assembly wherein it is unnecessary to unfasten the wheel suspension when assembling and removing the shaft. At the same time, it is intended to provide a drive shaft assembly for wheel drives, in the case of which, axial fixing of the universal joint at the wheel end to the wheel hub is improved.

SUMMARY OF THE INVENTION

Briefly, the present invention may be described as a shaft assembly for the wheel drive of a motor vehicle which is interposed between the wheel and the differential of the vehicle with a pair of universal joints, one at the wheel end and one at the transmission end, being provided. At least one of the universal joints is a plunging joint to enable axial shortening of the shaft assembly. The universal joint at the wheel end of the assembly is formed with a splined journal for engaging into the wheel hub with the axial length of the journal being smaller than the amount of axial shortening available in the shaft assembly by plunging movement of the plunging joint when the shaft assembly is built into the vehicle.

Thus, in accordance with the invention, the axial length of the splined journal or hub which is engaged with the wheel end at the shaft assembly is smaller than the amount of shaft assembly shortening which is achievable by the plunging joint or joints when the shaft is assembled in the vehicle. This results in considerable assembly advantages for the entire drive shaft assembly. After unfastening of the fixing means holding the splined journal of the joint at the wheel end in the wheel hub, it is possible to shorten the drive shaft assembly by means of the plunging joint or joints. It is then possible to swivel the shaft around the joint at the transmission end into the desired direction so that it can easily be removed. This applies in particular if the joint at the transmission end is connected to the differential gear assembly by a splined journal or hub.

In a preferred embodiment of the invention, the splined region of the journal or hub is produced without utilizing heat treatment. Furthermore, the tolerances of the splines of the wheel hub and of the splined journal and splined hub are preferably dimensioned in such a way that they engage into each other through pressure. By having unhardened spline teeth and close spline tolerances, the teeth engage tightly and gluing of the splines is avoided. At the outer joint member of the joint at the wheel end, an annular, preferably radial shoulder is formed against which the inner end face of the wheel hub, and possibly of the inner bearing ring, rests. Any bending moments coming from the wheel are supported by this joint shoulder so that the splined journal which is short as compared to the outer diameter of the joint shoulder receives practically no bending moments, but transmits only torque. The outer diameter of the joint shoulder is preferably 2.5 to 10 times, and preferably 3.3 to 5 times, e.g., 4 times, the length of the splined journal or hub. The splined journal or hub is axially fixed in the wheel hub by an axial threaded bolt supported on the wheel hub. This threaded bolt may pass through the wheel hub and, at the same time, it serves as an assembly tool. With the help of the threaded bolt, it is possible to pull the journal into the wheel hub under pressure or drive it out of it.

Preferably, the ratio of the axial length to the outer diameter of the splined journal or hub is smaller than 1. Generally, this ratio is in the region of 0.4 to 0.8. This smaller ratio (short journal) is also achieved by increasing the diameter of the splined journal so that the carrying face required for transmitting torque can be accommodated on the journal's circumference.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there are illustrated and described preferred embodiments of the invention.

DETAILED DESCRIPTION OF THE PREFERRED EMBODIMENTS

Figure 1:
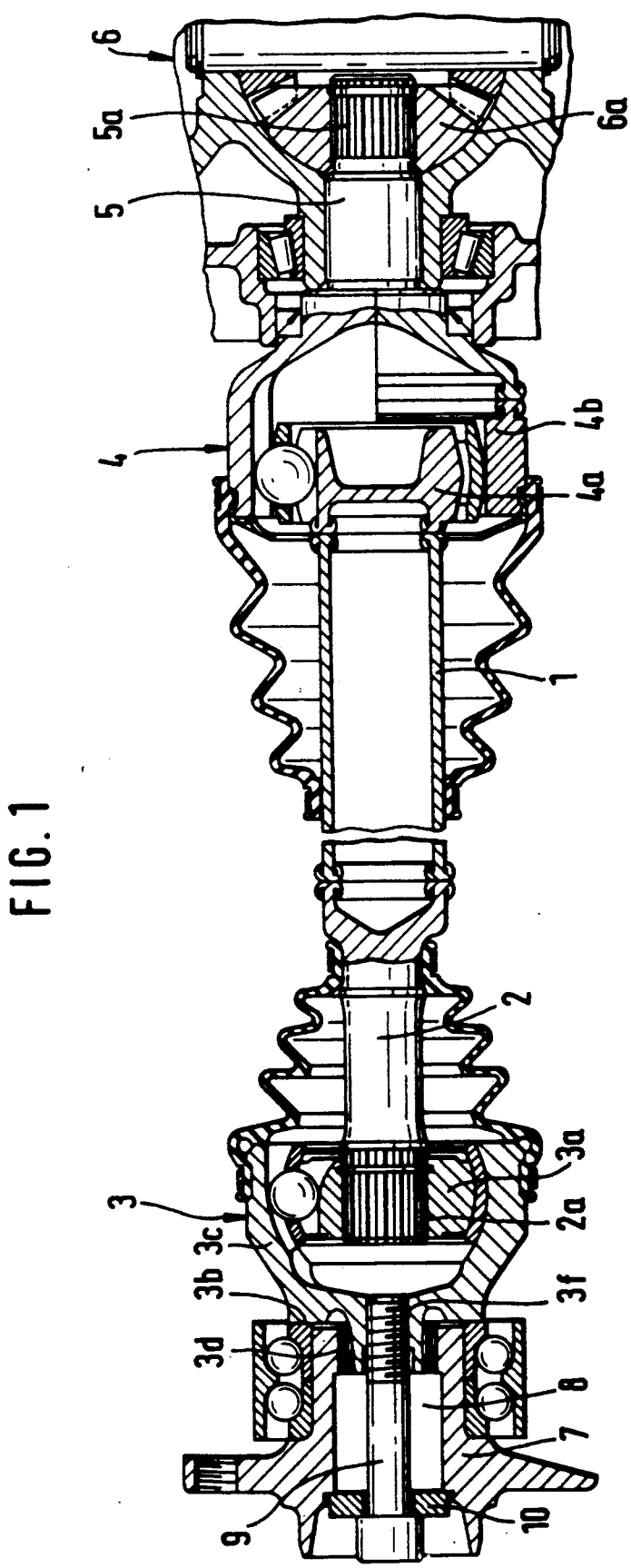
FIG. 1 is an axial sectional view of a front wheel drive shaft assembly with a fixed joint at the wheel end and a plunging joint at the transmission end, in accordance with the present invention.

Referring now to the drawings and particularly to FIG. 1, there is shown a drive shaft assembly in accordance with the present invention which consists of a shaft tube 1 having a sliding piece 2 welded at the wheel end of the tube 1 The shaft assembly includes a pair of universal joints 3 and 4, with the universal joint 3 being arranged at the wheel end and the universal joint 4 being arranged at the transmission end. The joint 3 is a constant velocity fixed joint and includes an inner joint member 3a which is rotatively affixed to a splined section 2a formed at the wheel end of the sliding piece 2.

The universal joint 4 is a constant velocity plunging joint comprising an inner joint member 4a which is welded to the tube 1. A shaft stub 5 is welded to an outer joint member 4b of the plunging joint 4, the stub 5 being provided with a splined journal 5a which engages into the output bevel gear 6a of a differential gear assembly 6.

Figure 2:
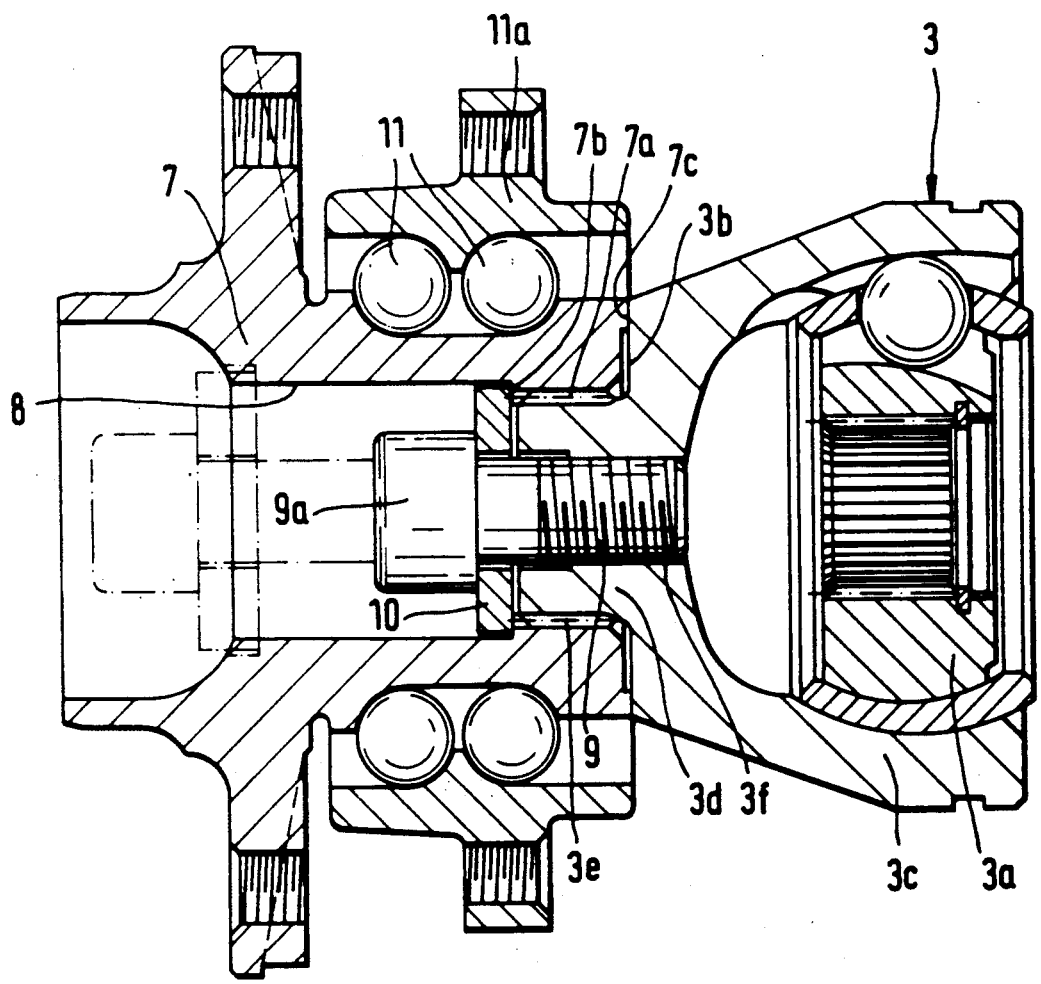
FIG. 2 is an axial partial sectional view of an embodiment of the invention at the wheel end connection of the drive shaft assembly shown on an enlarged scale.

As may be more clearly seen in FIG. 2, the universal joint 3 includes an outer joint member 3c which is provided with an annular, radial shoulder 3b and with a short, axial, splined hub 3d, the outer side of which is formed with the splines 3e. The assembly includes a wheel hub 7 which has an axial bore 8. At the inside or joint end of the axial bore 8, the wheel hub 7 is formed with a splined profile 7a which engages into the splined profile 3e of the hub 3d so that the outer joint member 3c is rotatively affixed with the wheel hub 7. In the hub bore 8, at the outer end of the splined profile 7a, an annular shoulder 7b is formed. The outer joint member 3c and the splined hub 3d are provided with an axial threaded bore 3f, into which a threaded bolt 9 is engaged. The head 9a of the bolt 9 is supported by means of an annular disc 10 on the shoulder 7b of the wheel hub 7. The hub 7 is rotatably supported by means of a double row angular contact ball bearing 11 in an outer ring 11a which is attached to a suitable wheel carrier of the vehicle (not illustrated). The inner ring of the ball bearing is formed in one piece with the hub 7 in FIG. 2.

In the case of the connection of the outer joint member 3c and the wheel hub 7 shown in FIG. 2, the annular shoulder 3b is firmly pulled against the inner end face 7c of the wheel hub 7 by the bolts 9. The relatively large diameter of the contact face provides good support for any bending torques so that such torques will not have an adverse effect on the splines 3e, 7a and the spline teeth serve largely to transmit torque. The small axial length of the splined hub 3d as compared to the outer diameter of the annular shoulder 3b also contributes toward insuring that any bending torque will have very little effect in the splined connection 3e, 7a.

The wheel end design shown in FIG. 1 differs from that of FIG. 2 in that a double row angular contact ball bearing with a divided inner ring (of the first generation) is used and the head 9a of the threaded bolt 9 is supported on the annular shoulder 7b at the outer end of the wheel hub bore 8. Independently of the position of its support, the bolt 9 is suitable as an assembly aid since it may be used to pull the splined hub 3d into the splined region of the bore 8 and out again. In the case of the drive shaft embodiment shown in FIG. 1, the splined hub 3d is shorter than the maximum plunging distance of the shaft assembly 1-5 in the direction of the differential gear assembly 6 made possible by the plunging joint 4.

The present invention facilitates the assembly and removal of the axial shafts. After unfastening the threaded bolt 9 from the threaded bore 3f, the shaft tube 1 together with the fixed joint 3 may be moved axially in the direction of the differential gear assembly 6 until the splined hub 3d has been removed from the bore 8. The shaft with the joint 3 may now be swiveled around the plunging joint 4 in any suitable direction without the wheel suspension system having to be unfastened. The entire drive shaft 1-5 may now be separated from the differential gear 6. This is particularly easy to accomplish if the connection at the transmission end is also effected by splined journals.

The drive shaft assembly in accordance with the present invention permits the joint size, the joint type and the bearing type to be freely selected so that optimum conditions can be provided.

It will be noted that the present invention is not limited to the specific embodiments described and, for example, both the joints may be plunging joints. The principle of the invention may be applied to front and rear wheel drive shafts. The joints provide a high degree of axial elasticity and safety against any unfastening of threads in the case of settlements.

Thus, in accordance with the present invention, it will be seen that there is provided a drive shaft assembly for the wheel drive of a motor vehicle which has a plunging joint and a fixed joint or two plunging joints, with the joint at the wheel end being provided with a splined journal or a splined hub for engaging into the wheel hub. The shaft assembly is characterized in that the wheel length of the splined journal or hub is shorter than the amount of shaft assembly which is achievable by plunging movement of the plunging joint or joints when the shaft assembly is built into the vehicle. As a result of the arrangement of the present invention, assembly and removal of the shaft assembly are greatly facilitated.

While specific embodiments of the invention have been shown and described in detail to illustrate the application of the inventive principles, it will be understood that the invention may be embodied otherwise without departing from such principles.

What is claimed is:

1. A drive shaft assembly for the wheel hub of a motor vehicle comprising:

a wheel hub rotatably mounted on said vehicle;

universal joint means including an axially plunging joint connected in a drive train for driving said wheel hub;

an axial splined journal having a limited axial length interposed in torque transmitting engagement between said universal joint means and said wheel hub permitting relative axial movement therebetween;

said limited axial length of said splined journal being smaller than an amount of axial shortening of said drive shaft assembly available by plunging movement of said plunging joint to enable disassembly of said drive shaft assembly without dismounting of said wheel hub from said vehicle;

bolt means extending axially at least coextensively with said splined journal and over a total length greater than said limited axial length of said splined journal connecting said wheel hub with said universal joint means; and opposed annular abutment faces on said wheel hub and on a part of said universal joint means arranged in direct abutting engagement with each other radially outwardly of said splined journal and axially adjacent thereto to absorb force moments acting on said splined journal, said annular abutment faces having an outer diameter which is 2.5 to 10 times said limited axial length.

2. An assembly according to claim 1, wherein said bolt means comprises a bolt having a first end in threaded engagement with said universal joint means and a second end in engagement with said wheel hub, wherein said splined journal extends generally along said first end and radially outwardly thereof and wherein the distance between the first end and said second end is substantially greater than said limited axial length of said splined journal.

3. An assembly according to claim 1, further comprising wheel bearing means for mounting said wheel hub to said vehicle, said bearing means including an inner wheel bearing ring mounting on said wheel hub formed integrally with said wheel hub and located adjacent said opposed abutment faces.

4. An assembly according to claim 1, further including wheel bearing means for mounting said wheel hub on said vehicle, said wheel bearing means including an inner bearing ring which is formed as a divided bearing ring consisting essentially of two separate parts mounted on said wheel hub with said opposed abutment faces including abutment faces formed on one of said parts of said inner bearing ring and abutment faces formed on said part of said universal joint means acting to hold said inner bearing ring in place.

5. An assembly according to claim 1, wherein the ratio of said limited axial length to the diameter of said splined journal is smaller than 1.

6. An assembly according to claim 5, wherein the ratio of said limited axial length to the diameter of said splined journal is from 0.4 to 0.8.

7. An assembly according to claim 6, wherein said annular abutment faces have an outer diameter which is 3.3 to 5 times said limited axial length.

* * * * *